US012774078B2

(12) United States Patent
Iwaya

(10) Patent No.: US 12,774,078 B2
(45) Date of Patent: Oct. 27, 2026

(54) FLIGHT CRAFT

(71) Applicant: Iwaya Inc., Ebetsu (JP)

(72) Inventor: Keisuke Iwaya, Ebetsu (JP)

(73) Assignee: Iwaya Inc. (JP)

( * ) Notice: Subject to any disclaimer, the term of this patent is extended or adjusted under 35 U.S.C. 154(b) by 0 days.

(21) Appl. No.: 18/884,261

(22) Filed: Sep. 13, 2024

(65) Prior Publication Data

US 2025/0187716 A1 Jun. 12, 2025

(30) Foreign Application Priority Data

Sep. 15, 2023 (JP) ................................ 2023-150275

(51) Int. Cl.
*B64B 1/58* (2006.01)

(52) U.S. Cl.
CPC ...................................... *B64B 1/58* (2013.01)

(58) Field of Classification Search
CPC .... B64B 1/50; B64B 1/58; B64B 1/40; B64B 1/42
See application file for complete search history.

(56) References Cited

U.S. PATENT DOCUMENTS 1,283,773 A * 11/1918 Dutton ...................... B64B 1/64 244/99
1,289,703 A * 12/1918 Dutton ...................... B64B 1/64 296/145
9,834,297 B2 * 12/2017 Brookes .................... B64B 1/62
9,908,607 B1 * 3/2018 Fourie ........................ B64B 1/58
2021/0053667 A1 * 2/2021 Kennan ...................... B64B 1/50
2021/0237842 A1 * 8/2021 MacCallum .............. B64B 1/64
2021/0394886 A1 * 12/2021 Leidich .................. B64D 17/80
2022/0212771 A1 * 7/2022 Iwaya ................... F16B 11/006

OTHER PUBLICATIONS

Office Action issued in the corresponding Chinese Patent Application No. 202411284654.1; issued on Jan. 22, 2025 (total 12 pages).

* cited by examiner

*Primary Examiner* — Magdalena Topolski
*Assistant Examiner* — Anna L. Gordon
(74) *Attorney, Agent, or Firm* — Harness, Dickey & Pierce, P.L.C.

(57) ABSTRACT

A flight craft comprises: an intermediate member, which has an annular shape in a plan view and has a flat cross-sectional shape when cut along a plane that includes a straight line in a direction of the plan view; a plurality of gores, each of which extends from an outer side to an inner side of the intermediate member in the plan view, passes through an inner opening of the intermediate member, is folded back, and then extends from the inner side to the outer side of the intermediate member in the plan view; a front side member, which is positioned on a front side of the intermediate member, where the front side is defined as a side facing outward in the plan view, and a rear side is defined as a side opposite to the front side; a rear side member that is positioned on a rear side of the intermediate member; and a tightening mechanism that tightens the front side member and the rear side member in a direction that brings them closer to each other.

7 Claims, 15 Drawing Sheets

FLIGHT CRAFT

TECHNICAL FIELD

This invention relates to a flight craft equipped with an envelope, such as a balloon.

BACKGROUND ART

A flight craft, such as a balloon or an airship, is equipped with a bag-like structure referred to as an envelope. Flight is achieved by utilizing buoyant force generated when the envelope is filled with heated air or with a gas lighter than air, such as helium.

In a flight craft equipped with an envelope, as described above, it may be necessary to provide an attachment to the envelope. For example, an attachment for opening and closing mechanism a vent provided in the envelope, by which a crew can operate or instruct to operate the mechanism to open or close the vent, and thereby release at an appropriate timing a desired amount of gas from the envelope. In this way, control is exerted over a rate of ascent or descent of the flight craft.

The envelope is comprised of gores, which are made of a thin and lightweight sheet-like material, which can be easily damaged if subjected to a large localized external force. To reduce a risk of such damage, Patent Document 1 proposes a configuration in which a flat inner member positioned on an inner side of the envelope and a flat outer member positioned on an outer side of the envelope are fastened with the envelope sandwiched therebetween. The inner and outer members are fastened by use of, for example, tightening members such as bolts and nuts allowing for attachment of the assembly of the inner and outer members to the envelope.

The assembly described in Patent Document 1 is attached to the envelope such that it is in surface contact with the envelope. As a result, a force applied to the envelope due to a weight of the assembly is evenly distributed, rather than being concentrated at a localized area of the envelope. Consequently, according to the invention described in Patent Document 1, a risk of damage to the envelope is reduced as compared to a case where such an assembly is attached to the envelope in a manner that causes a force to be concentrated at a localized area of the envelope.

PRIOR ART DOCUMENT

Patent Document

Patent Document 1: JP2022-079418A

SUMMARY OF THE INVENTION

Problem to be Solved by the Invention

In Patent Document 1, fixing of the envelope to the assembly is achieved by way of frictional forces that are generated on the inner and outer surfaces of the envelope under tightening the inner and outer members. Consequently, if a downward force acts on the envelope due to a load of an object for transport suspended beneath the envelope, and the downward force exceeds the frictional forces, the envelope may shift and move from between the inner and outer members. Furthermore, in a configuration where a shaft of a bolt used to tighten the inner and outer members penetrates the envelope, the envelope may tear upon movement at a point where it is in contact with the shaft of the bolt.

This invention has been made in view of the above circumstances and provides a means to reduce a risk of an envelope moving from between tightening members in a flight craft equipped with an envelope. Specifically, in a configuration where an object is attached to the envelope by use of tightening members that are provided on both the inner and outer sides of gores that together form the envelope, the invention seeks to minimize a risk of the gores moving from between the tightening members.

Means for Solving the Problem

The present invention provides a flight craft comprising: an intermediate member, which has an annular shape in a plan view and has a flat cross-sectional shape when cut along a plane that includes a straight line in a direction of the plan view; a plurality of gores, each of which extends from an outer side to an inner side of the intermediate member in the plan view, passes through an inner opening of the intermediate member, is folded back, and then extends from the inner side to the outer side of the intermediate member in the plan view; a front side member, which is positioned on a front side of the intermediate member, where the front side is defined as a side facing outward in the plan view, and a rear side is defined as a side opposite to the front side; a rear side member that is positioned on a rear side of the intermediate member; and a tightening mechanism that tightens the front side member and the rear side member in a direction that brings them closer to each other.

Advantageous Effects of the Invention

According to the present invention, if a downward pulling force is applied to a gore, the gore is caught by the inner edge of the intermediate member, making it less likely that the gore will move from between the front side member and the rear side member. As a result, compared to the configuration described in Patent Document 1, the gore is less likely to move from between the two members.

MODES FOR CARRYING OUT THE INVENTION

[1] Exemplary Embodiment

Figure 1:
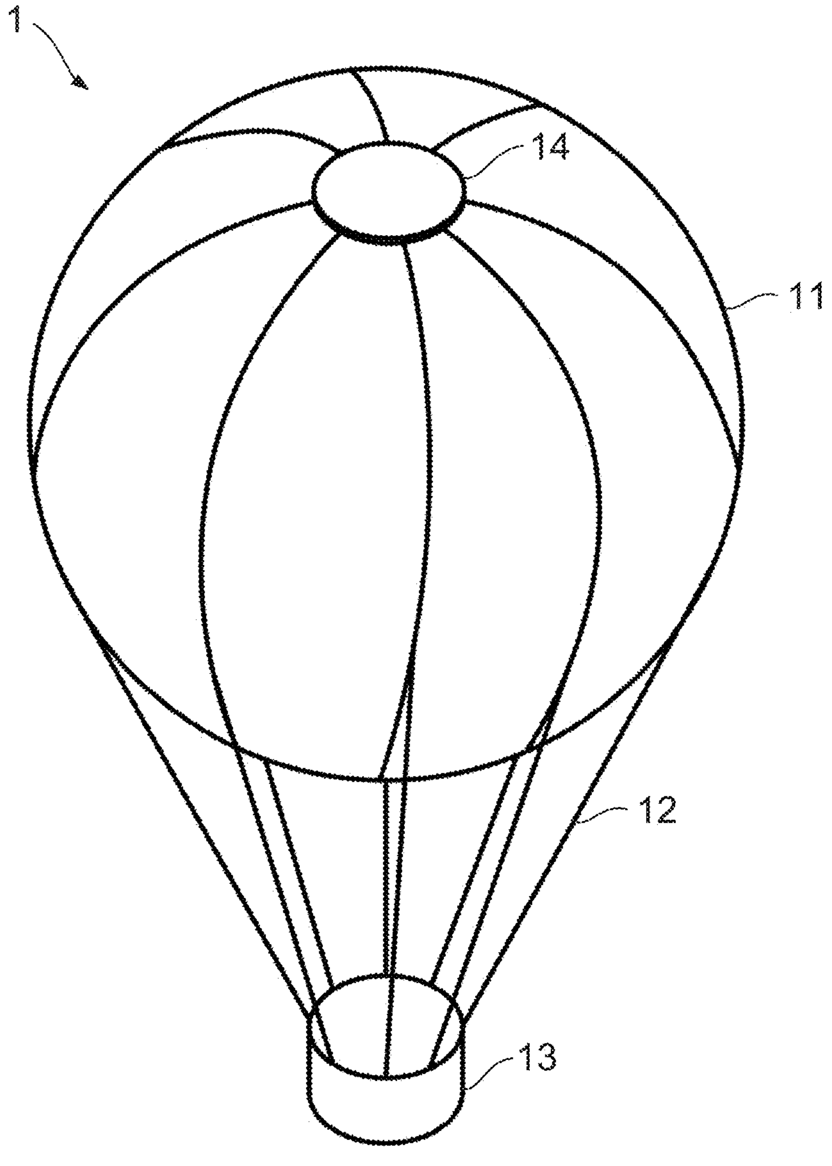
FIG. 1 is a diagram illustrating a flight craft according to an exemplary embodiment of the present invention.

FIG. 1 is a diagram illustrating a flight craft 1 according to an exemplary embodiment of the present invention. The flight craft 1 includes an envelope 11, which is a bag-like structure that contains a gas lighter than air (hereinafter referred to as "light gas") such as helium, a plurality of suspension ropes 12 with their upper ends attached to the envelope 11 and their lower ends extending downward from the envelope 11, and a container 13 attached to the lower ends of the suspension ropes 12. The container 13 is a vessel that accommodates objects (including people) for transport via the sky by the flight craft 1. When transporting people, the container 13 may be referred to as a cabin.

The flight craft 1 further includes an assembly 14 that is comprised of a plurality of components and when assembled, is attached to the envelope 11.

In the following description, as an example, the assembly 14 is a structure that is attached to cover an exhaust port provided at the top of the envelope 11, and is equipped with an opening and closing mechanism that allows crew members inside the container 13 to control opening and closing of the exhaust port.

Figure 2:
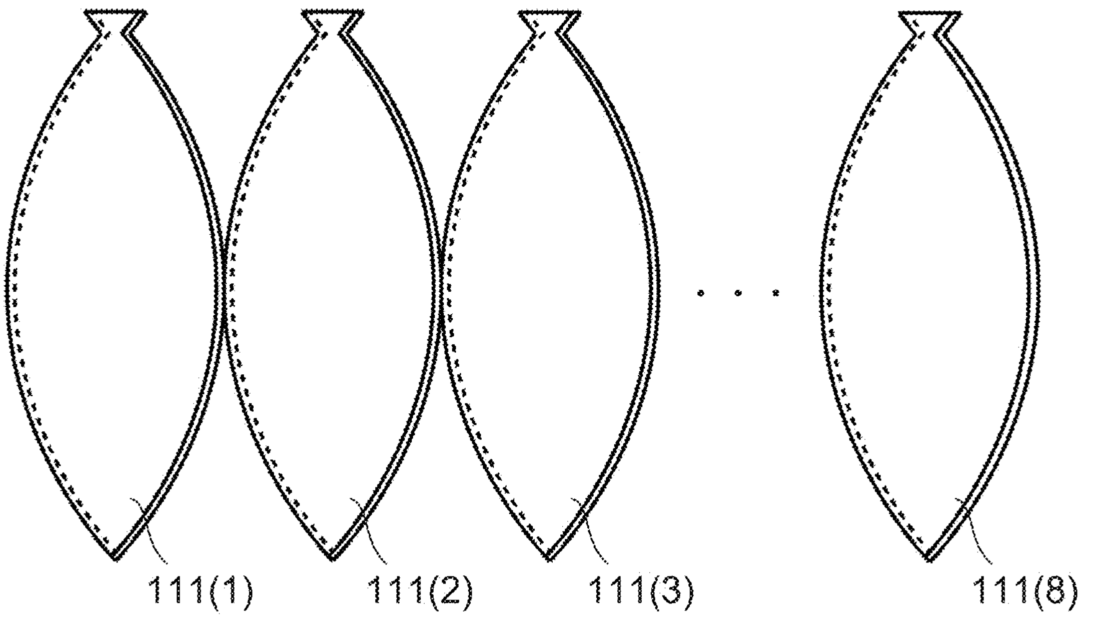
FIG. 2 is a diagram illustrating an example of shapes of gores that together form an envelope according to the exemplary embodiment of the present invention.

FIG. 2 is a diagram illustrating examples of shapes of multiple gores that together form the envelope 11. In the example shown in FIG. 2, the envelope 11 is composed of eight gores 111, each of which is a generally boat-shaped sheet-like member. To distinguish between the eight gores 111, they are respectively denoted as gores 111(1), gores 111(2), and so on, as shown in FIG. 2.

For example, the right edge of gore 111(1) (solid line area) and the left edge of gore 111(2) (dashed line area), the right edge of gore 111(2) and the left edge of gore 111(3), . . . , and the right edge of gore 111(8) and the left edge of gore 111(1) are joined by heat welding or other means to provide a spherical shape as a whole for constitution of the envelope 11.

Each gore 111 has a fish-tail shaped portion at the top of the envelope 11 to allow folding, as described later.

Figure 3:
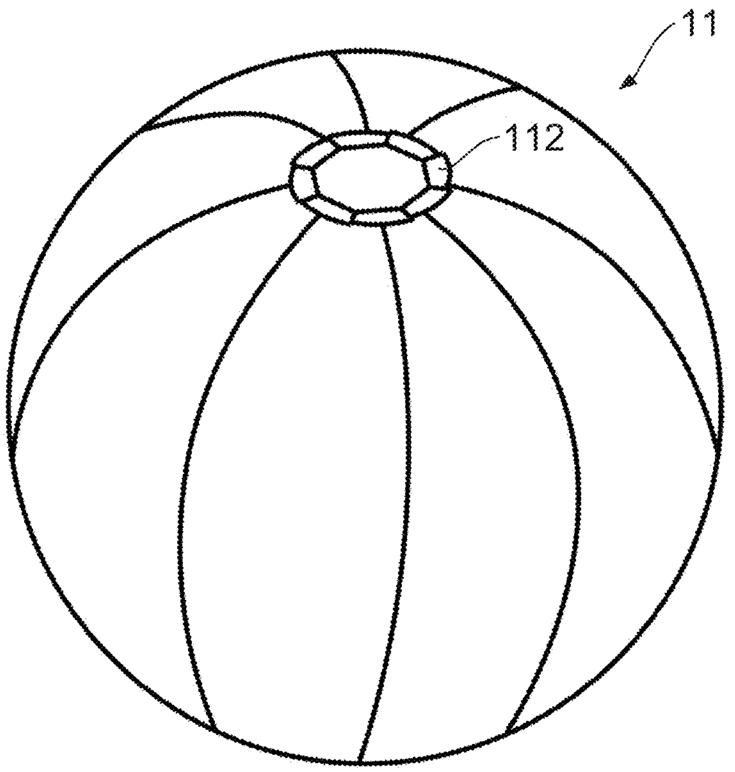
FIG. 3 is a diagram illustrating a shape of the envelope according to the exemplary embodiment of the present invention.

FIG. 3 is a diagram illustrating the envelope 11 formed by joining the gores 111 shown in FIG. 2. As shown in FIG. 3, the envelope 11 has an opening at the top and includes a generally annular folded portion 112 that surrounds the opening. The folded portion 112 is formed by joining the fish-tail shaped portions of the gores 111.

The assembly 14 includes an intermediate member 141, an outer member 142, an outer sealing member 143, an inner member 144, an inner sealing member 145, a fastening member 146, outer screw hole sealing members 147, and inner screw hole sealing members 148.

Figure 4A:
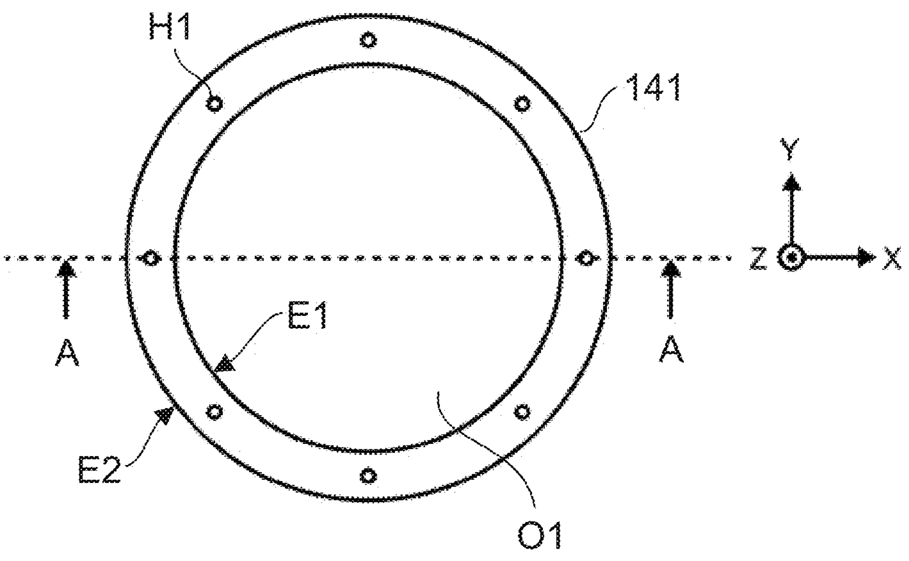
FIG. 4A is a diagram showing a front side of an intermediate member according to the exemplary embodiment of the present invention.
Figure 4B:
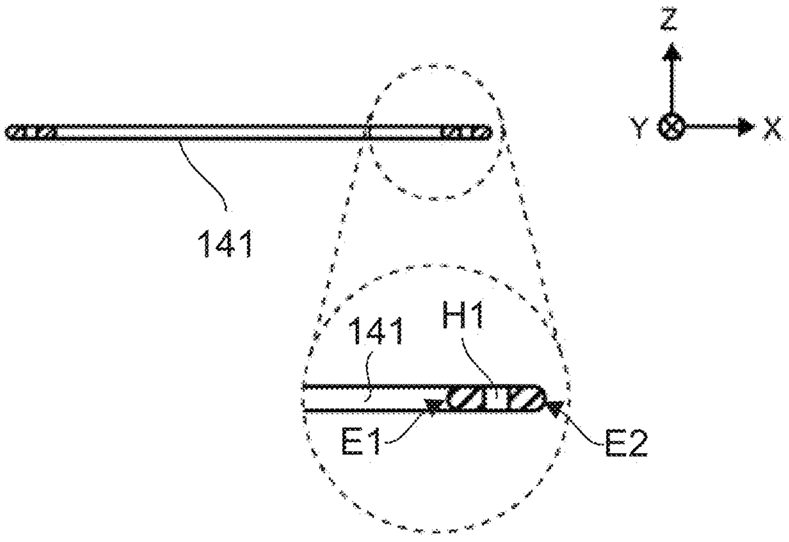
FIG. 4B is a cross-sectional view of the intermediate member according to the exemplary embodiment of the present invention, taken along the broken line in FIG. 4A and viewed in the direction of arrow A.

FIGS. 4A and 4B illustrate the intermediate member 141. FIG. 4A is a plan view of the front side of the intermediate member 141. In the following description, the front side refers to the side visible when the envelope 11 is viewed from the outside (Z-axis positive direction), and the rear side refers to the opposite side (Z-axis negative direction).

The plan view of the rear side of intermediate member 141 is the same as that of the front side, as shown in FIG. 4A.

FIG. 4B is a cross-sectional view of intermediate member 141, taken along the broken line in FIG. 4A and viewed in the direction of arrow A (Y-axis positive direction).

As shown in FIG. 4A, in plan view the intermediate member 141 has an annular shape, with an inner opening O1 (an example of an inner opening) provided inside. The cross section of the intermediate member 141 when cut along a plane that includes a straight line in the plan view direction (such as a plane perpendicular to the Y-axis or X-axis), is flat. The intermediate member 141 is made of a material that is harder than the envelope 11, such as a rigid plastic or a lightweight metal.

The intermediate member 141 has a plurality of holes H1 (eight in the example shown in FIG. 4A), each of which extends in the Z-axis direction through the front and rear sides. The holes are provided to allow passage of the shafts of bolts 1461, which constitute part of the fastening member 146 as will be described later.

The inner edge E1 and outer edge E2 of the intermediate member 141, as seen in plan view, are chamfered to prevent damage to the gores 111 when a force acts on the edges.

Figure 5A:
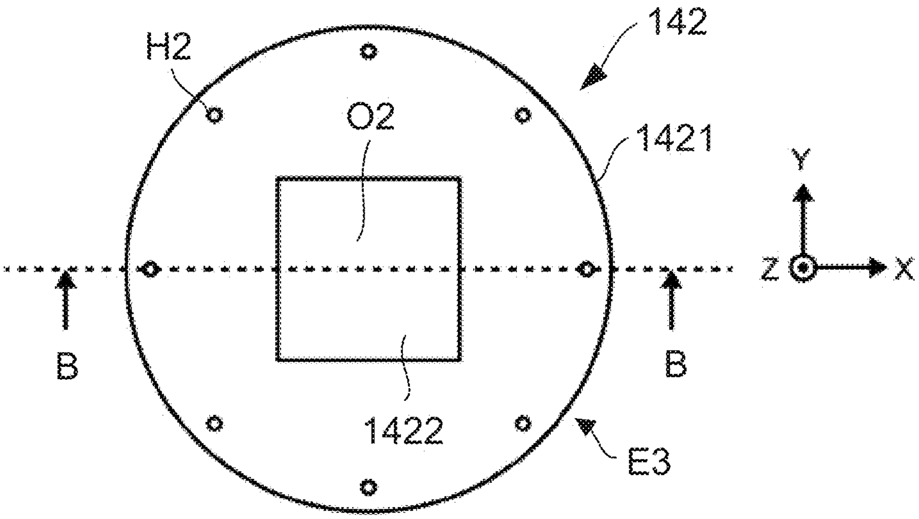
FIG. 5A is a plan view of a front side of a front side member according to the exemplary embodiment of the present invention.
Figure 5B:
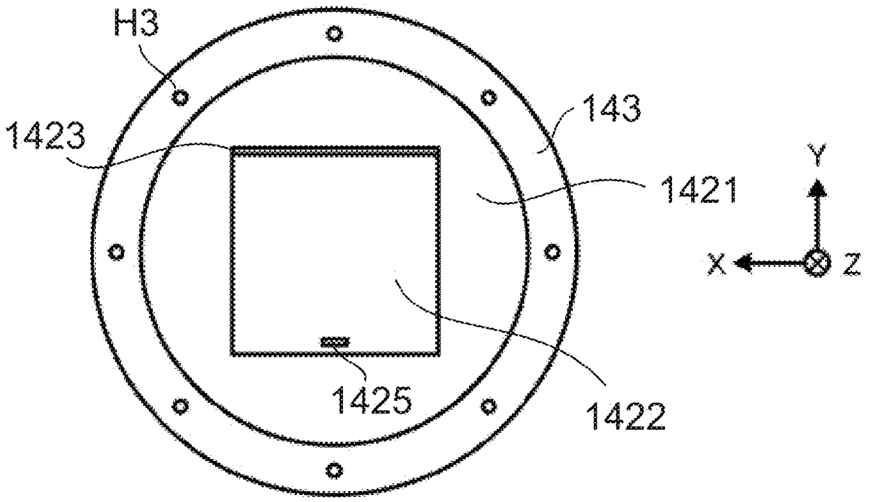
FIG. 5B is a plan view of a rear side of the front side member according to the exemplary embodiment of the present invention.
Figure 5C:
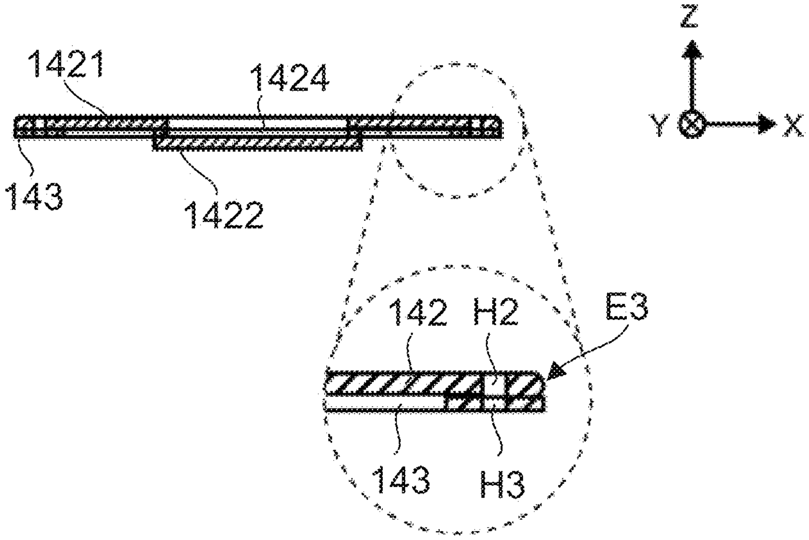
FIG. 5C is a cross-sectional view of the front side member according to the exemplary embodiment of the present invention, taken along the broken line in FIG. 5A and viewed in the direction of arrow B.
Figure 6:
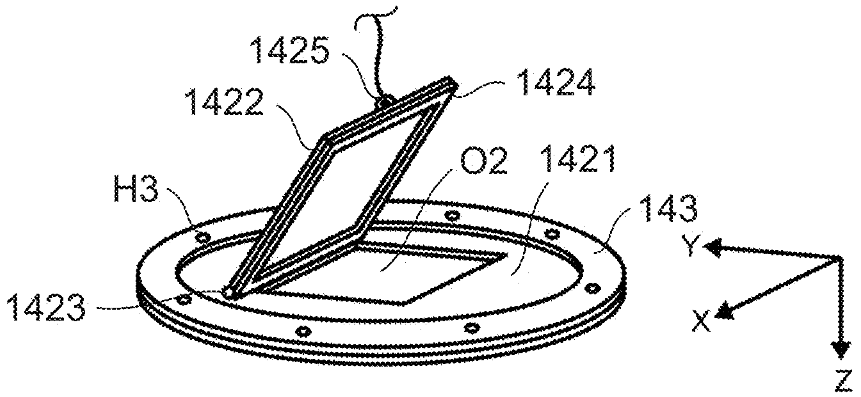
FIG. 6 is a diagram illustrating the front side member according to the exemplary embodiment of the present invention.

FIGS. 5A, 5B, 5C and 6 illustrate the outer member 142. FIG. 5A is a plan view of the front side of the outer member 142. FIG. 5B is a plan view of the rear side of the outer member 142. FIG. 5C is a cross-sectional view of the outer member 142, taken along the broken line in FIG. 5A and viewed in the direction of arrow B (Y-axis positive direction). FIG. 6 is an oblique rear-side view of the outer member 142 in a state where the lid 1422, which is included in the outer member 142, is open.

As shown in FIGS. 5A, 5B, 5C and 6, the outer member 142 is generally disc-shaped in plan view. When cut along a plane that includes a straight line in the plan view direction (such as a plane perpendicular to the Y-axis or X-axis), its cross section is flat.

The outer member 142 comprises a main body 1421, a lid 1422, which is attached to the main body 1421 to close the opening O2, and in plan view is centrally located, a hinge 1423, which connects the lid 1422 to the main body 1421 in an openable and closable manner, a sealing member 1424, which ensures airtight sealing between the main body 1421 and the lid 1422 when the lid is pressed against the main body 1421 to close the opening O2.

The hinge 1423 contains a spring or similar mechanism that biases the lid 1422 toward the closed position against the main body 1421 to seal the opening O2. A hook 1425 is attached to the lid 1422, and the upper end of a control cable 15 is connected to the hook 1425. The lower end of the control cable 15 extends into the container 13, allowing the crew inside the container 13 to pull the cable and open the lid 1422, so as to release gas from inside to outside of the envelope 11. When the crew ceases to pull the control cable 15, the lid 1422 moves and closes the opening O2, and release of the gas stops.

The outer edge E3 of the outer member 142, as seen in plan view, is chamfered to prevent damage to the gores 111 when a force acts on the outer edge.

The main body 1421 of the outer member 142 is made of a material that is harder than the envelope 11, such as a rigid plastic or a lightweight metal.

The outer member 142 has a plurality of holes H2 (eight in the examples shown in FIGS. 5A, 5B and 6) that extend through both the front and rear sides in the Z-axis direction, allowing the shafts of the bolts 1461 to pass therethrough. The holes H2 are positioned in the assembly 14 to align with the holes H1 in the intermediate member 141.

On the rear surface of the outer member 142, an outer sealing member 143 is attached by use of, for example, double-sided tape. The outer sealing member 143 is an annular component that is positioned between the outer member 142 and the intermediate member 141, and is covered by the folded portions of the gores 111. The outer sealing member 143 extends around the entire circumference of the intermediate member 141.

The outer sealing member 143 is an annular elastic member that has a flat cross-section when cut along a plane including a straight line in the plan view direction (such as a plane perpendicular to the Y-axis or X-axis). The outer sealing member 143 has a plurality of holes H3 (eight in the examples shown in FIGS. 5A, 5B and 6) that extend through both the front and rear sides in the Z-axis direction, allowing the shafts of the bolt 1461 to pass therethrough. The holes H3 are positioned in the assembly 14 to align with the holes H1 in the intermediate member 141 and the holes H2 in the outer member 142.

In the assembly 14, the outer sealing member 143 is positioned such that it contacts both the inner and outer sides of the holes H1 in the intermediate member 141 as seen in plan view. As a result, the outer sealing member 143 seals the pathway through which gas may otherwise escape between the intermediate member 141 and the outer member 142, thereby preventing leakage of gas outside of the envelope 11.

Figure 7A:
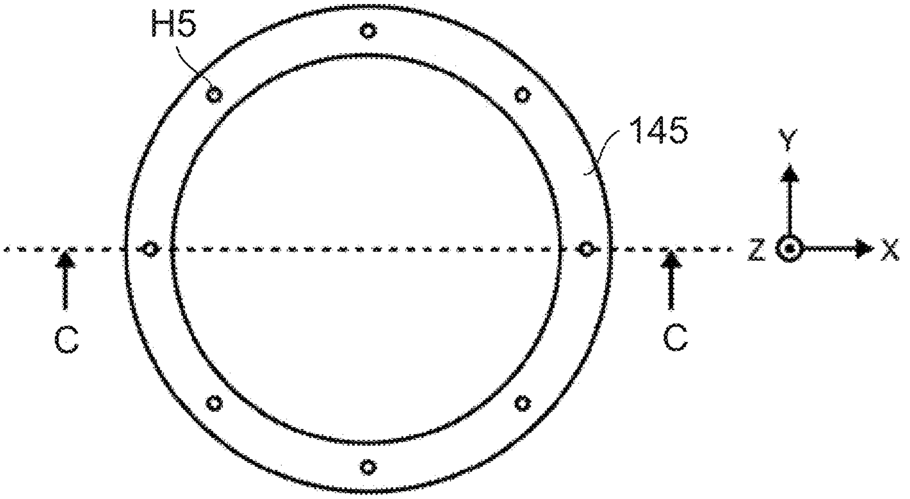
FIG. 7A is a plan view of a front side of the rear side member according to the exemplary embodiment of the present invention.
Figure 7B:
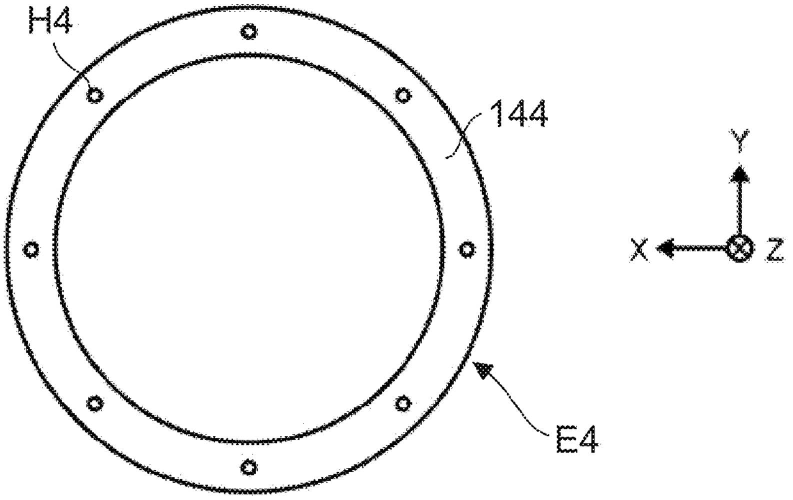
FIG. 7B is a plan view of a rear side of the rear side member according to the exemplary embodiment of the present invention.
Figure 7C:
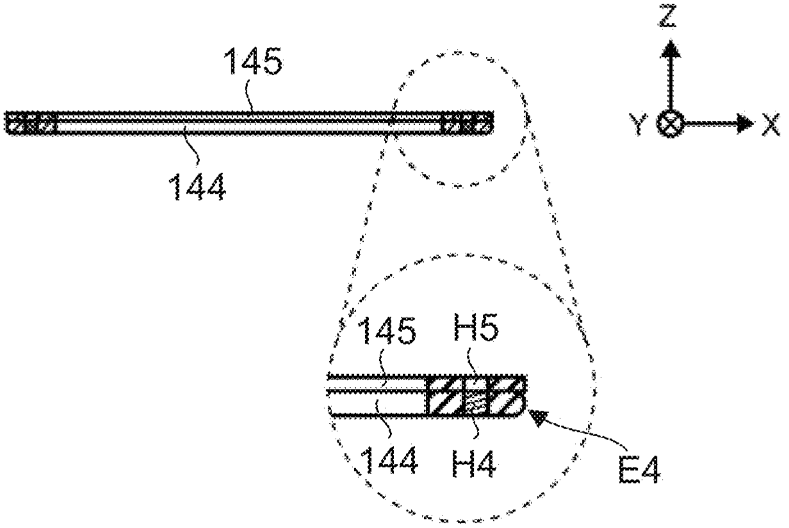
FIG. 7C is a cross-sectional view of the rear side member according to the exemplary embodiment of the present invention, taken along the broken line in FIG. 7A and viewed in the direction of arrow C.

FIGS. 7A, 7B and 7C illustrate the inner member 144. FIG. 7A is a plan view of the front side of the inner member 144. FIG. 7B is a plan view of the rear side of the inner member 144. FIG. 7C is a cross-sectional view of the inner member 144, taken along the broken line in FIG. 7A and viewed in the direction of arrow C (Y-axis positive direction).

As shown in FIGS. 7A, 7B and 7C, the inner member 144 has an annular shape in plan view. Its cross-section, when cut along a plane that includes a straight line in the plan view direction (such as a plane perpendicular to the Y-axis or X-axis), is flat. The inner member 144 is made of a material that is harder than the envelope 11, such as a rigid plastic or a lightweight metal.

The inner member 144 has a plurality of holes H4 (eight in the example shown in FIGS. 7A and 7B), which extend in the Z-axis direction through both the front and rear sides, allowing the shafts of the bolt 1461 to pass therethrough. The holes H4 are positioned in the assembly 14 to align with the holes H1 in the intermediate member 141, the holes H2 in the outer member 142, and the holes H3 in the outer sealing member 143. The inner surfaces of the holes H4 are machined to have threads that correspond to threads machined into the shafts of the bolts 1461.

The outer edge E4 of the inner member 144, as seen in plan view, is chamfered to prevent damage to the gores 111 when force acts on the edge.

On the front surface of the inner member 144, an inner sealing member 145 is attached, for example, by use of double-sided tape. In the assembly 14, the inner sealing member 145 is placed between the inner member 144 and the intermediate member 141, which is covered by the folded portion of the gores 111. The inner sealing member 145 extends around the entire circumference of the intermediate member 141.

The inner sealing member 145 is an annular elastic member with a flat cross-section when cut along a plane including a straight line in the plan view direction (such as a plane perpendicular to the Y-axis or X-axis). The inner sealing member 145 has a plurality of holes H5 (eight in the example of FIGS. 7A and 7B) that extend through both the front and rear sides in the Z-axis direction, allowing the shafts of the bolt 1461 to pass therethrough. The holes H5 are positioned in the assembly 14 to align with the holes H1 in the intermediate member 141, the holes H2 in the outer member 142, the holes H3 in the outer sealing member 143, and the holes H4 in the inner member 144.

In the assembly 14, the inner sealing member 145 is positioned such that it contacts both the inner and outer sides of the holes H1 in the intermediate member 141, as viewed in plan view. As a result, the inner sealing member 145 seals a pathway through which gas might otherwise escape between the intermediate member 141 and the inner member 144, thereby preventing leakage of gas from outside of the envelope 11.

Figure 8A:
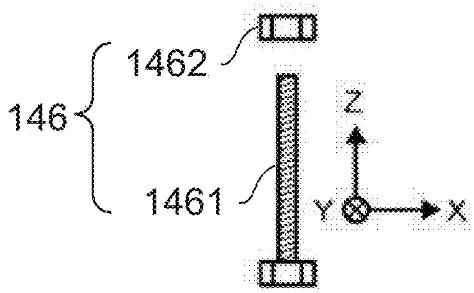
FIG. 8A is a side view of a bolt and nut that constitute a tightening member according to the exemplary embodiment of the present invention.
Figure 8C:
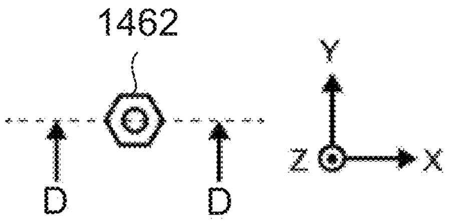
FIG. 8C is a plan view of a front side of the nut that constitutes the tightening member according to the exemplary embodiment of the present invention.
Figure 8B:
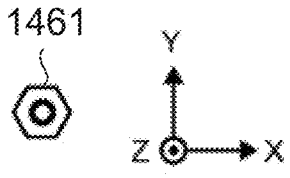
FIG. 8B is a plan view of a front side of the bolt that constitutes the tightening member according to the exemplary embodiment of the present invention.
Figure 8D:
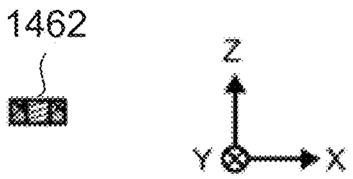
FIG. 8D is a cross-sectional view of the nut that constitutes the tightening member according to the exemplary embodiment of the present invention, taken along the broken line in FIG. 8C and viewed in the direction of arrow D.

FIGS. 8A, 8B, 8C and 8D illustrate the fastening member 146. In this embodiment, the fastening member 146 consists of eight sets of bolts 1461 and nuts 1462. FIG. 8A is a side view of a single bolt 1461 and nut 1462 (viewed, for example, in the Y-axis positive direction). FIG. 8B is a plan view of the front side of the bolt 1461. FIG. 8C is a plan view of the front side of the nut 1462. FIG. 8D is a cross-sectional view of the nut 1462, taken along the broken line in FIG. 8C and viewed in the direction of arrow D (Y-axis positive direction).

The outer surface of the shaft of the bolt 1461 has a ridged thread machined into it. The inner surface (in contact with the hole) of the nut 1462 has a grooved thread machined into it that corresponds to the outer surface ridge thread of the bolt 1461.

Figure 9A:
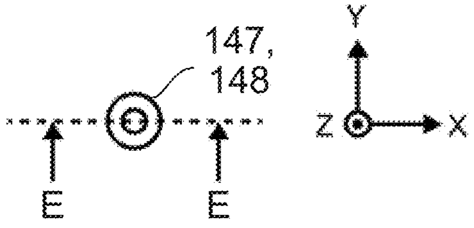
FIG. 9A is a plan view of a front side of a front side screw hole sealing member or a rear side screw hole sealing member according to the exemplary embodiment of the present invention.
Figure 9B:
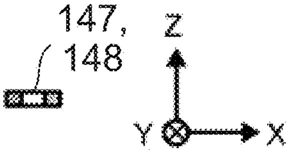
FIG. 9B is a cross-sectional view of the front side screw hole sealing member or the rear side screw hole sealing member according to the exemplary embodiment of the present invention, taken along the broken line in FIG. 9A and viewed in the direction of arrow E.

FIGS. 9A and 9B illustrate the outer screw hole sealing member 147 and the inner screw hole sealing member 148. The outer screw hole sealing member 147 and the inner screw hole sealing member 148 constitute the same component; however, in the assembly 14, the outer screw hole sealing member 147 is placed on the front side of the outer member 142, while the inner screw hole sealing member 148 is placed on the rear side of the inner member 144.

FIG. 9A is a plan view of the front side of the outer screw hole sealing member 147 or the inner screw hole sealing member 148. FIG. 9B is a cross-sectional view of the outer screw hole sealing member 147 or the inner screw hole sealing member 148, taken along the broken line in FIG. 9A and viewed in the direction of arrow E (Y-axis positive direction).

The outer screw hole sealing member 147 and the inner screw hole sealing member 148 are each elastic members that have an annular shape. Their cross-sections are flat when cut along a plane including a straight line in the plan view direction (such as a plane perpendicular to the Y-axis or X-axis). The inner openings of each of the outer screw hole sealing member 147 and the inner screw hole sealing member 148 serve as holes for passage of the shafts of the bolts 1461. Additionally, the holes serve to seal a gas flow path through the holes made in the gores 111 for the bolts 1461, thereby preventing leakage of gas outside of the envelope 11.

The plan view of the rear side of the outer screw hole sealing member 147 or the inner screw hole sealing member 148 is the same as the plan view of the front side shown in FIG. 9A.

The procedure for assembling the assembly 14 is described below.

Figure 10A:
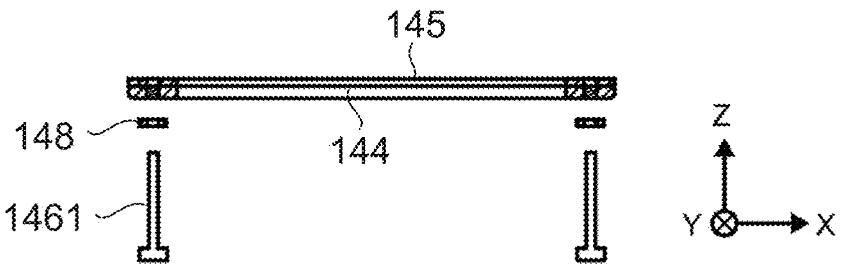
FIG. 10A is a diagram illustrating a state before the bolt is screwed into the rear side member according to the exemplary embodiment of the present invention.
Figure 10B:
FIG. 10B is a diagram illustrating a state after the bolt has been screwed into the rear side member according to the exemplary embodiment of the present invention.

First, an operator inserts the shaft of bolt 1461, which has been passed through the hole of the inner screw hole sealing member 148, into each of the eight holes H4 (which communicate with the holes H5 of the inner sealing member 145) in the inner member 144 from the rear side to the front side. Upon insertion of the shaft of the bolt 1461, the grooved threads on the inner surface of the hole H4 engages with the ridged thread on the outer surface of the bolt 1461, whereby the bolt 1461 can be securely screwed into the inner member 144. FIG. 10A illustrates a state before the bolts 1461 are screwed into the inner member 144, while FIG. 10B illustrates a state after the bolts 1461 have been screwed into member 144.

Next, the operator inserts the inner member 144, to which the inner sealing member 145, the inner screw hole sealing member 148, and the bolts 1461 are attached, into the inside of the envelope 11 through the opening at the top of the envelope 11.

Figure 11:
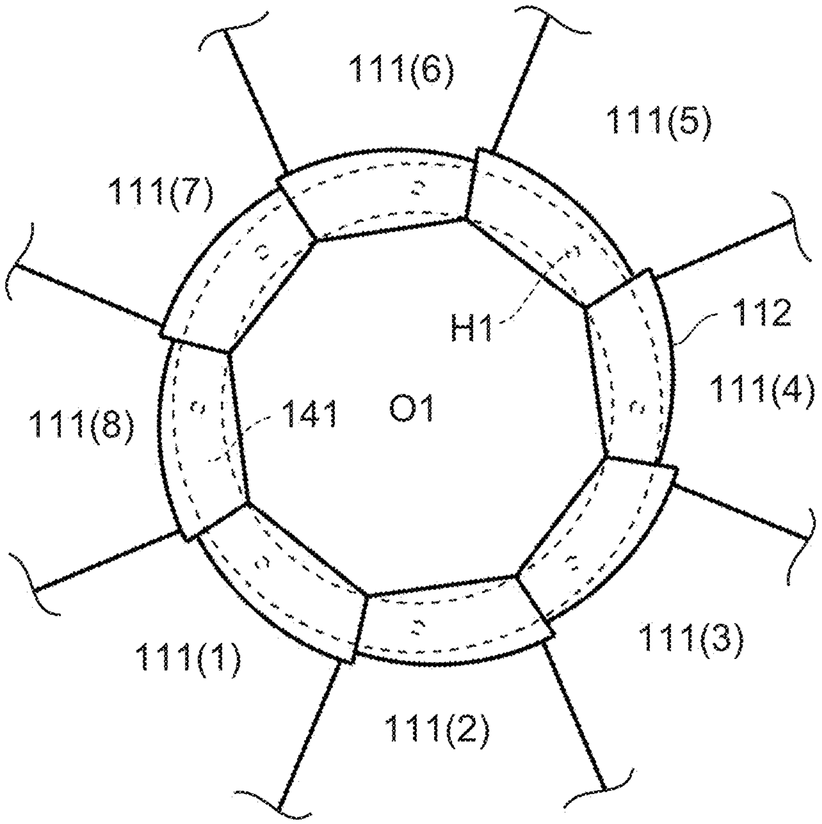
FIG. 11 is a diagram illustrating a state in which a folded portion of the envelope is folded back from the inner side to the outer side of the intermediate member, covering both the rear side and the front side of the intermediate member according to the exemplary embodiment of the present invention.

Then, the operator passes the folded portion 112 at the top of the envelope 11 through the opening O1 of the intermediate member 141, from the rear side to the front side, and folds it back and outward from the inner side (closer to the opening O1 in the XY plane) to the outer side (farther from the opening O1 in the XY plane). FIG. 11 illustrates a state in which the folded portions 112 have been folded back from the inner side to the outer side of the intermediate member 141, covering both its rear and front sides.

As shown in FIG. 11, the gores 111 extend from the outer side (farther from the opening O1 in the XY plane) toward the inner side (closer to the opening O1 in the XY plane), pass through the opening O1 of the intermediate member 141, and are then folded back to extend outward again.

Next, the operator uses a punch or similar tool to create holes in the gores 111 at positions that align with the holes H1 in the intermediate member 141, thereby allowing the shafts of the bolts 1461 to pass therethrough.

Then, the operator aligns the inner member 144, which was previously inserted inside the envelope 11, such that the positions of the eight bolts 1461 match the positions of the eight holes H1 in the intermediate member 141. The bolts 1461 are then inserted through the holes H1 from the rear side to the front side (Z-axis positive direction).

Next, the operator aligns the outer member 142, to which outer sealing member 143 is attached, such that the positions of its eight holes H2 (aligned with the holes H3 of the outer sealing member 143) match the positions of the eight bolts 1461. Then, the bolts 1461 are inserted through the holes H2 from the rear side to the front side (Z-axis positive direction).

The operator then installs the outer screw hole sealing member 147 such that its holes align with the shafts of the eight bolts 1461, which pass therethrough from the rear side to the front side. Finally, the nuts 1462 are screwed onto each of the eight bolts 1461, thereby securing the outer member 142 and the inner member 144 by tightening them toward each other.

Once the bolts 1461 are screwed into the nuts 1462 under an appropriate torque, installation of the assembly 14 onto the envelope 11 is complete.

Figure 12A:
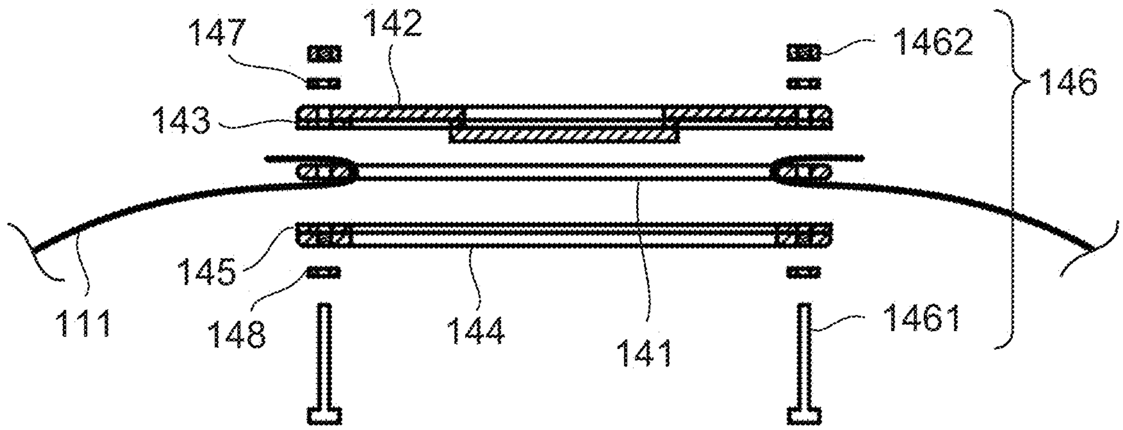
FIG. 12A is a diagram illustrating an assembly before attachment to the envelope according to the exemplary embodiment of the present invention.
Figure 12B:
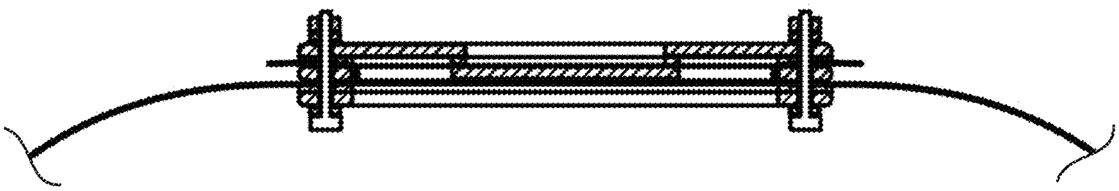
FIG. 12B is a diagram illustrating the assembly after attachment to the envelope according to the exemplary embodiment of the present invention.

FIGS. 12A and 12B illustrate the assembly 14 before and after attachment to the envelope 11. FIG. 12A is a cross-sectional view of the assembly 14 before attachment, while FIG. 12B is a cross-sectional view of the assembly 14 after attachment.

In the assembly 14, the gores 111 are folded through the opening O1 of the intermediate member 141 and clamped between the outer member 142 and the inner member 144. Therefore, even if a downward force acts on the gores 111 due to a load of the container 13 or other objects carried via the suspension ropes 12, the gores 111 are less likely to move between the outer member 142 and the inner member 144. As a result, damage such as tearing at the points where the gores 111 contact the shafts of the bolts 1461 is less likely to occur.

[Modifications]

The above-described embodiment may be modified in various ways. Following are examples of modifications of the above-described embodiment. Two or more of the above-described embodiments and the following modifications may be combined.

(1) In the above-described embodiment, the outer sealing member 143 is assumed to be a single component with multiple holes H3. However, the outer sealing member 143 may be composed of multiple annular sealing members that are arranged to contact an entire circumference of the intermediate member 141.

Figure 13:
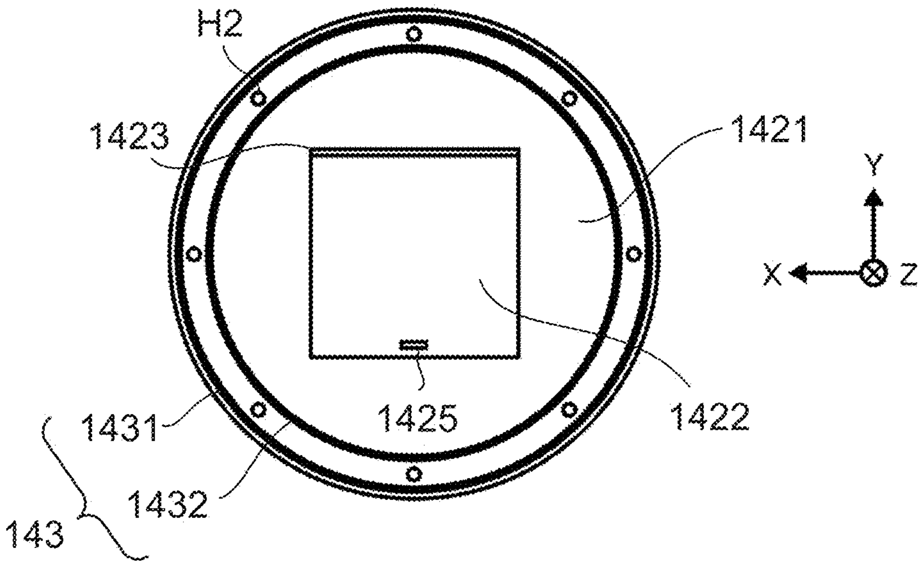
FIG. 13 is a diagram illustrating a modified example according to the exemplary embodiment in which the front side sealing member is positioned on the rear surface of the front side member.

FIG. 13 illustrates a variation of this configuration, showing a state where the outer sealing member 143 is placed on the rear surface of the outer member 142 (viewed from the rear side of the outer member 142). As shown in FIG. 13, the outer sealing member 143 consists of an annular sealing member 1431 positioned outside the multiple holes H2 in the outer member 142, and another annular sealing member 1432 positioned inside the multiple holes H2.

As shown in FIG. 13, the sealing member 1431, placed on the rear surface of the outer member 142, is positioned in the assembly 14 to contact the entire circumference of the intermediate member 141 on the outer side of the holes H1 as viewed in plan view. Similarly, the sealing member 1432, placed on the rear surface of the outer member 142, is positioned in the assembly 14 to contact the entire circumference of the intermediate member 141 on the inner side of the holes H1 as viewed in plan view.

At least one of the sealing member 1431 and the sealing member 1432 may be composed of two or more concentric annular sealing members. In such a case, if one of the concentric sealing members becomes ineffective due to damage or another reason, other of the two or more sealing members can maintain the sealing function, and prevent leakage of gas outside of the envelope 11.

(2) In the above-described embodiment, the inner sealing member 145 is assumed to be a single component with a plurality of holes H5. Instead, the inner sealing member 145 may be composed of a plurality of annular sealing members, each of which is arranged to contact the entire circumference of the intermediate member 141.

Figure 14:
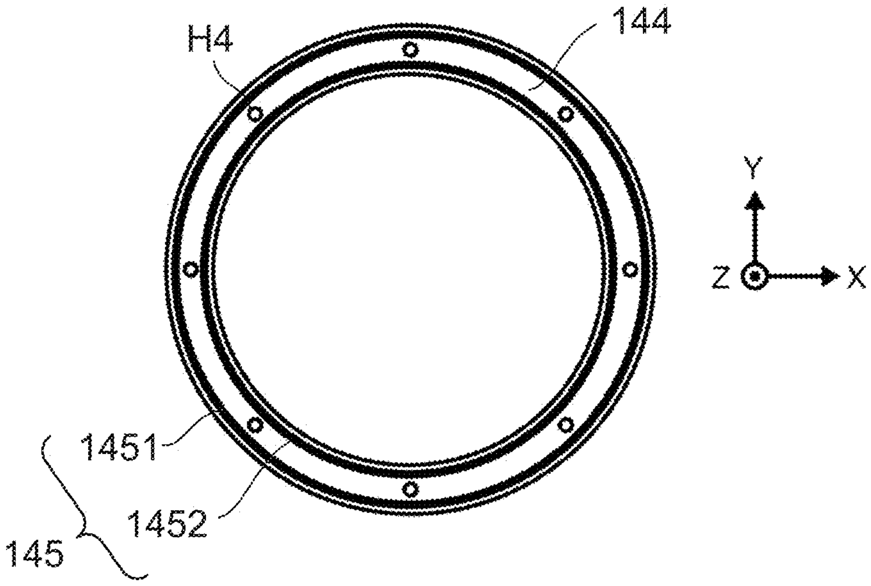
FIG. 14 is a diagram illustrating a modified example according to the exemplary embodiment in which the rear side sealing member is positioned on the front surface of the rear side member.

FIG. 14 illustrates a variation of this configuration, showing a state where the inner sealing member 145 is placed on the front surface of the inner member 144 (viewed from the front side of the inner member 144). In FIG. 14, the inner sealing member 145 consists of an annular sealing member 1451, positioned outside the plurality of the holes H4 in the inner member 144, and another annular sealing member 1452, positioned inside the plurality of holes H4.

As shown in FIG. 14, the sealing member 1451, placed on the front surface of the inner member 144, is positioned in the assembly 14 so as to contact the entire circumference of the intermediate member 141 on the outer side of the holes H1 as viewed in plan view. Similarly, the sealing member 1452, placed on the front surface of the inner member 144, is positioned in the assembly 14 so as to contact the entire circumference of the intermediate member 141 on the inner side of the holes H1 as viewed in plan view.

At least one of the sealing member 1451 and the sealing member 1452 may be composed of two or more concentric annular sealing members. In such a case, if one of the concentric sealing members becomes ineffective due to damage or for another reason, other of the two or more of the sealing members can maintain the sealing function, and prevent leakage of gas outside of the envelope 11.

(3) In the above-described embodiment, the intermediate member 141 is assumed to have a circular shape in plan view. However, the shape of the intermediate member 141 need not necessarily be circular as long as it is annular. For example, the intermediate member 141 may have an elliptical annular shape or a rounded polygonal annular shape in plan view. In such a case, the outer member 142, the outer sealing member 143, the inner member 144, and the inner sealing member 145 may each have a shape that corresponds to a shape of the intermediate member 141.

(4) In the above-described embodiment, the inner edge E1 and outer edge E2 of the intermediate member 141, the outer edge E3 of the outer member 142, and the outer edge E4 of the inner member 144 are chamfered to reduce a risk of damaging the gores 111 upon contact. In addition to or instead of chamfering these edges, the assembly 14 may include a cushioning member positioned to cover at least one of these edges.

For example, the entire surface of the intermediate member 141, outer member 142, or inner member 144, or all of them, may be coated with an elastic material such as silicone rubber. The elastic material functions as a cushioning member.

Figure 15:
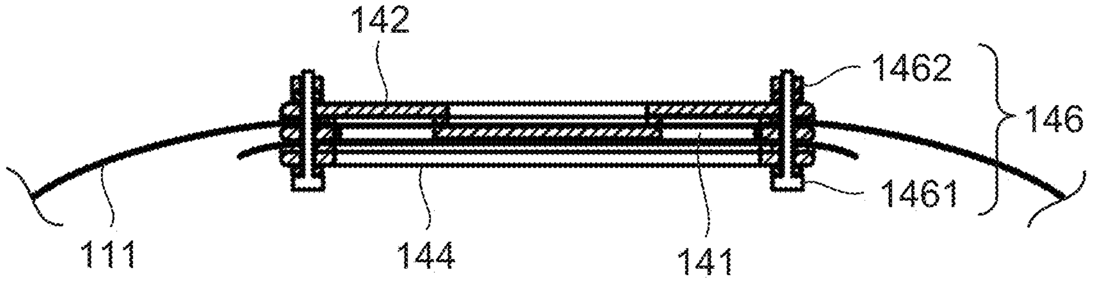
FIG. 15 is a cross-sectional view of an assembly according to a modified example of the exemplary embodiment.

(5) In the above-described embodiment, the upper ends of the gores 111 are passed through the inner opening O1 of the intermediate member 141 from the rear side to the front side and then folded back. However, the upper ends of the gores 111 may be passed through the inner opening O1 from the front side to the rear side and then folded back. FIG. 15 is a cross-sectional view of the assembly 14 showing to this variation.

(6) In the above-described embodiment, the assembly 14 is attached to the top of the envelope 11. However, the assembly 14 may be attached to a location other than the top of the envelope 11.

(7) In the above-described embodiment, the assembly 14 is assumed to function as a structure for opening and closing the exhaust port of the envelope 11. However, the role of the assembly 14 is not limited to this function. For example, the assembly 14 may be structured as a mounting platform for attaching various sensors and other devices to the inside or outside of the envelope 11.

(8) In the above-described embodiment, the outer member 142 has no openings other than the holes H2 when the lid 1422 is closed, and the inner member 144 has no openings other than the holes H4 leading to the inside. As long as a required airtightness of the envelope 11 is maintained, configurations may be adopted where: the outer member 142 has additional (permanently open) openings other than the holes H2, the outer member 142 has no openings other than the holes H2, or the inner member 144 has no openings other than the holes H4.

(9) In the above-described embodiment, the flight craft 1 is assumed to be a gas balloon. However, as long as it is a flight craft 1 is a flight craft equipped with an envelope, the flight craft is not limited to a gas balloon. For example, the flight craft 1 may be a hot-air balloon or an airship.

(10) In the above-described embodiment, the fastening member 146 includes the intermediate member 141, the gores 111, which are folded back after passing through the inside of the intermediate member 141, covering both the front and rear sides of the intermediate member 141, the outer member 142 and inner member 144, which sandwich the intermediate member 141 and the gores 111, and the sealing members which prevent leakage of gas from inside to outside of the envelope 11. The sealing members include the outer sealing member 143, the inner sealing member 145, the outer screw hole sealing members 147, and the inner screw hole sealing members 148.

If sufficient airtightness of the envelope 11 can be secured without use of these sealing members (for example, in a case where the flight craft 1 is a hot-air balloon and does not require high airtightness), some or all of these sealing members may be omitted.

Furthermore, in addition to the intermediate member 141, the gores 111, the outer member 142, and the inner member 144, non-sealing components may also be attached to the envelope 11 by tightening the fastening member 146.

Figure 16A:
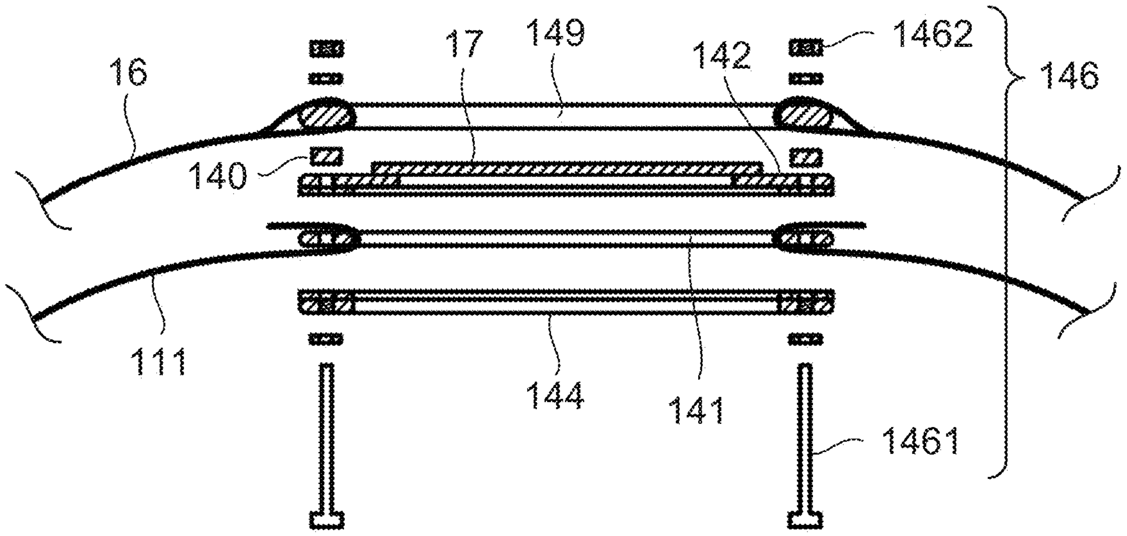
FIG. 16A is a cross-sectional view of the assembly according to the modified example of the exemplary embodiment before assembly.
Figure 16B:
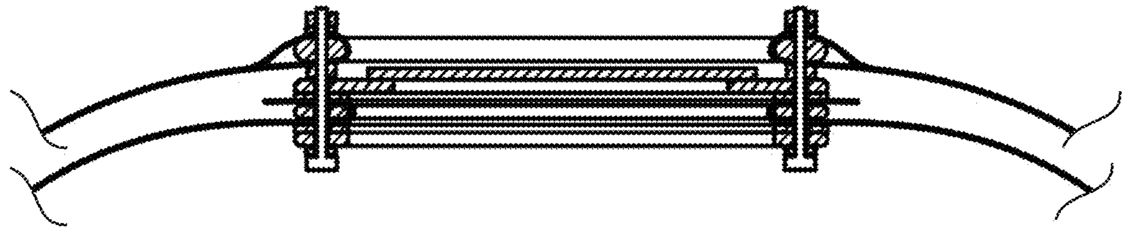
FIG. 16B is a cross-sectional view of the assembly according to the modified example of the exemplary embodiment after assembly.

FIGS. 16A and 16B illustrate an example of such a component, showing an assembly 14 in which a rigid ring 149 is attached to the envelope 11 using the fastening member 146. FIG. 16A shows the assembly 14 before assembly, while FIG. 16B shows the assembly 14 after assembly. The rigid ring 149 is positioned on the front surface of the outer member 142, with spacers 140 provided in between, and is fastened together with the outer member 142 by use of the fastening member 146 (the bolts 1461 and the nuts 1462).

For example, the upper ends of load tapes 16 may be connected to the rigid ring 149, with the lower ends of the load tapes 16 connected to the upper ends of the suspension ropes 12. As a result, the load of the suspended cargo does not act directly on the envelope 11, thereby reducing a risk of damage to the envelope 11 due to stress under load.

Additionally, in the example shown in FIGS. 16A and 16B, a disc-shaped module 17 is attached to the outer member 142 in an airtight manner from the front side, to cover the opening. The module 17 is designed to be easily attachable and detachable from the outer member 142, so as to allow facilitate ease of selection of interchangeable modules having different functions. In this case, the assembly 14 functions as a mounting platform for attaching the module 17 to the envelope 11.

(11) In the above-described embodiment, holes are made in the gores 111 to allow the shafts of the bolt 1461 to pass therethrough. However, a configuration may be adopted where no holes are made in the gores 111 for passing parts of the fastening member 146.

Figure 17A:
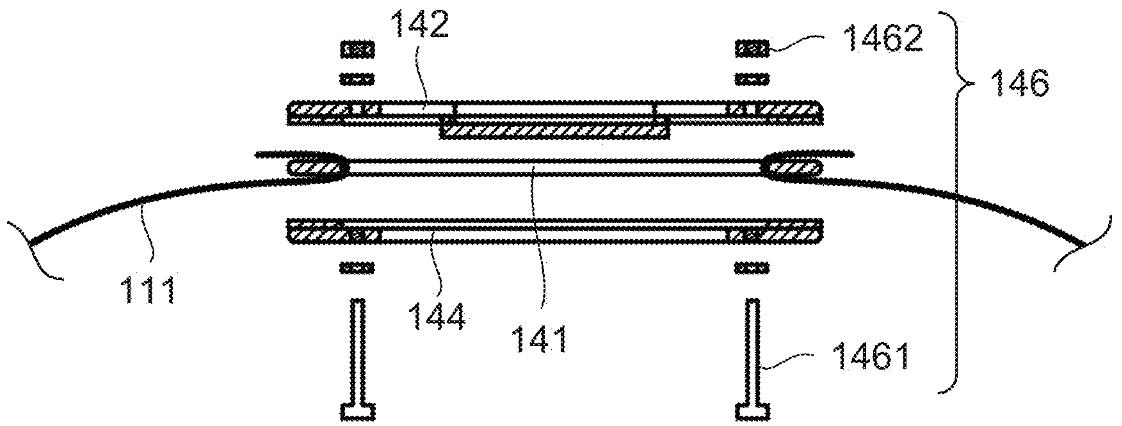
FIG. 17A is a cross-sectional view of the assembly according to a modified example of the exemplary embodiment before assembly.
Figure 17B:
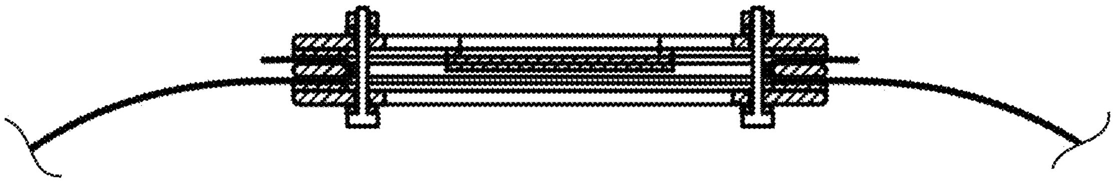
FIG. 17B is a cross-sectional view of the assembly according to the modified example of the exemplary embodiment after assembly.

FIGS. 17A and 17B illustrate an assembly 14 with such a configuration. FIG. 17A shows the assembly 14 before assembly, while FIG. 17B shows the assembly 14 after assembly. In the assembly 14 shown in FIGS. 17A and 17B, the shafts of the bolts 1461 pass through the inner opening O1 of the intermediate member 141. As a result, there is no need to make holes in the gores 111, which are arranged to cover the intermediate member 141, for passing the shafts of the bolts 1461.

(12) In the above-described embodiment, the fastening member 146, which secures the outer member 142 and inner member 144 by tightening them toward each other, consists of the bolts 1461 and the nuts 1462. However, fastening mechanisms other than the combination of the bolts 1461 and the nuts 1462 may be used. For example, instead of use of a screw-type mechanism, fastening may be achieved by use of riveting, clamping bands, or other any other appropriate fastening mechanism.

Figure 18A:
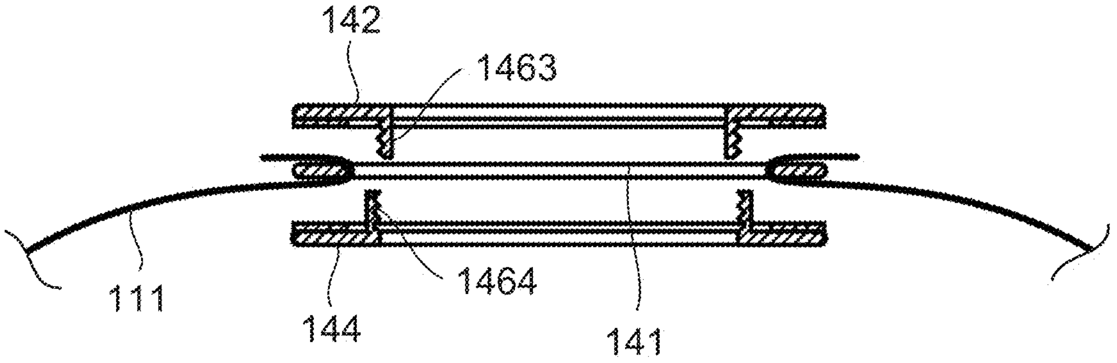
FIG. 18A is a cross-sectional view of the assembly according to a modified example of the exemplary embodiment before assembly.
Figure 18B:
FIG. 18B is a cross-sectional view of the assembly according to the modified example of the exemplary embodiment after assembly.

FIGS. 18A and 18B illustrate an assembly 14 with a fastening mechanism that is different from the combination of the bolts 1461 and the nuts 1462. FIG. 18A shows the assembly 14 before assembly, while FIG. 18B shows the assembly 14 after assembly. The assembly 14 shown in FIGS. 18A and 18B includes: an inner cylindrical member 1463, which protrudes rearward (Z-axis negative direction) from the outer member 142, and an outer cylindrical member 1464, which protrudes forward (Z-axis positive direction) from the inner member 144. A ridge thread is machined on the outer surface of the inner cylindrical member 1463, and a matching groove thread is machined on the inner surface of the outer cylindrical member 1464.

In this variation, instead of using the bolts 1461 and the nuts 1462, the fastening mechanism consists of the inner cylindrical member 1463 and the outer cylindrical member 1464. The inner cylindrical member 1463 may be integrally molded with the outer member 142, or it may be attached to the outer member 142 by use of welding or adhesion. Similarly, the outer cylindrical member 1464 may be integrally molded with the inner member 144, or it may be attached to the inner member 144 by use of welding or adhesion.

The operator can secure the assembly 14 to the envelope 11 by screwing the inner cylindrical member 1463 into the outer cylindrical member 1464, thereby tightening the outer member 142 and inner member 144 toward each other.

(13) In the above-described embodiment, the outer sealing member 143 is attached to the rear surface of the outer member 142, and the outer member 142 and the outer sealing member 143 are positioned on the front side of the intermediate member 141, which is covered by the folded gores 111. However, the outer sealing member 143 need not necessarily be attached to the outer member 142. In such a case, the operator may first place the outer sealing member 143 on the front side of the intermediate member 141, which is covered by the folded gores 111, and then place the outer member 142 on top thereof.

Similarly, in the above-described embodiment, the inner sealing member 145 is attached to the front surface of the inner member 144, and the inner member 144 and the inner sealing member 145 are positioned on the rear side of the intermediate member 141, which is covered by the folded gores 111. However, the inner sealing member 145 need not necessarily be attached to the inner member 144. In such a case, the operator may first place the inner sealing member 145 on the rear side of the intermediate member 141, which is covered by the folded gores 111, and then place the inner member 144 on top thereof.

(14) In the above-described embodiment, each of the gores 111 has a fish-tail shaped portion at the top of the envelope 11. However, as long as the folded portion 112 is shaped such that it can be folded outward after passing through the opening O1 of the intermediate member 141, the shape of the gores 111 and the envelope 11 formed for being joining may vary. For example, if the assembly 14 is attached to the top of the envelope 11, the portion of the gores 111 located at the top may be rectangular in shape.

DESCRIPTION OF REFERENCE NUMERALS

1: Flight craft
11: Envelope
12: Suspension ropes
13: Container
14: Assembly
15: Control cable
16: Load tape
17: Module
111: Gore
140: Spacer
141: Intermediate member
142: Outer member
143: Outer sealing member
144: Inner member
145: Inner sealing member
146: Fastening member
147: Outer screw hole sealing member
148: Inner screw hole sealing member
149: Rigid ring
1421: Main body
1422: Lid
1423: Hinge
1424: Sealing member
1425: Hook
1431: Sealing member
1432: Sealing member
1451: Sealing member
1452: Sealing member
1461: Bolt
1462: Nut
1463: Inner cylindrical member
1464: Outer cylindrical member

The invention claimed is:

1. A flight craft comprising:

an intermediate member, which has an annular shape in a plan view and has a flat cross-sectional shape when cut along a plane that includes a straight line in a direction of the plan view;

a plurality of gores, each of which extends from an outer side to an inner side of the intermediate member in the plan view, passes through an inner opening of the intermediate member, is folded back, and then extends from the inner side to the outer side of the intermediate member in the plan view;

where a front side is defined as a side facing outward in the plan view, and a rear side is defined as a side opposite to the front side, a front side member, which is positioned on the front side of the intermediate member such that portions of the folded-back gores covering the front side of the intermediate member are interposed between the front side member and the intermediate member;

a rear side member that is positioned on the rear side of the intermediate member such that portions of the folded-back gores covering the rear side of the intermediate member are interposed between the rear side member and the intermediate member;

a tightening mechanism that tightens the front side member and the rear side member in a direction that brings them closer to each other to clamp the intermediate member and the folded-back gores therebetween such that the portions of the folded-back gores covering the front side of the intermediate member are clamped between the front side member and the intermediate member and the portions of the folded-back gores covering the rear side of the intermediate member are clamped between the rear side member and the intermediate member;

a front side sealing member, which is annular and is positioned between the front side member and the intermediate member such that it is covered by the gores which are folded back, and is arranged to be in contact with an entire circumference of the intermediate member which is annular; and a rear side sealing member, which is annular and is positioned between the rear side member and the intermediate member such that it is covered by the gores which are folded back, and is arranged to be in contact with an entire circumference of the annular intermediate member.

2. The flight craft according to claim 1, wherein:

the tightening mechanism has a member arranged so as to pass through a hole opened in the intermediate member;

the front side sealing member comprises a front outer sealing member and a front inner sealing member, the rear side sealing member comprises a rear outer sealing member and a rear inner sealing member, the front outer sealing member is arranged to be in contact with the entire circumference of a front surface of the intermediate member on an outer side of the hole opened in the intermediate member when the intermediate member is viewed in the plan view, the front inner sealing member is arranged to be in contact with the entire circumference of the front surface of the intermediate member on an inner side of the hole opened in the intermediate member when the intermediate member is viewed in the plan view, the rear outer sealing member is arranged to be in contact with the entire circumference of a rear surface of the intermediate member on the outer side of the hole opened in the intermediate member when the intermediate member is viewed in the plan view, and the rear inner sealing member is arranged to be in contact with the entire circumference of the rear surface of the intermediate member on the inner side of the hole opened in the intermediate member when the intermediate member is viewed in the plan view.

3. The flight craft according to claim 2, wherein:

the front side sealing member has a plurality of annular sealing members, each of which is arranged to be in contact with the entire circumference of the intermediate member.

4. The flight craft according to claim 2, wherein:

the rear side sealing member has a plurality of annular sealing members, each of which is arranged to be in contact with the entire circumference of the intermediate member.

5. The flight craft according to claim 1, wherein:

a shape of the intermediate member in the plan view is circular.

6. The flight craft according to claim 1, wherein:

at least one of an inner edge of the intermediate member, an outer edge of the intermediate member, an outer edge of the front side member, and an outer edge of the rear side member is chamfered.

7. The flight craft according to claim 2, further comprising:

a cushioning member arranged to cover at least one of an inner edge of the intermediate member, an outer edge of the intermediate member, an outer edge of the front side member, and an outer edge of the rear side member.

* * * * *